(No Model.)
S. D. RAPPAPORT.
SUPPORT FOR CHATELAINES.
No. 575,007. Patented Jan. 12, 1897.
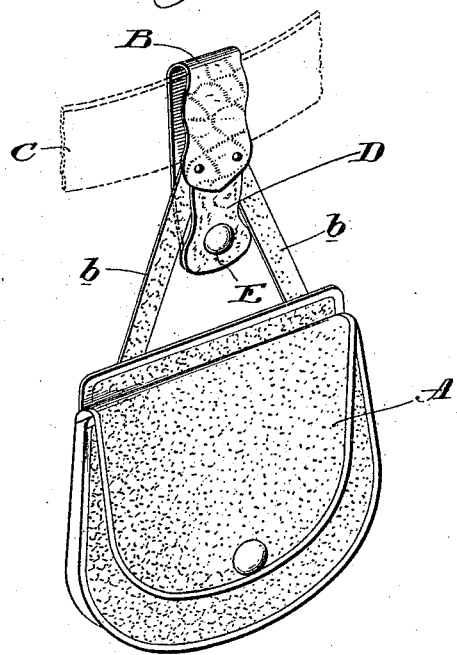
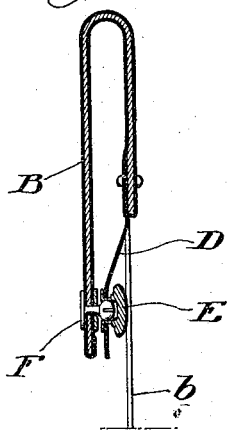
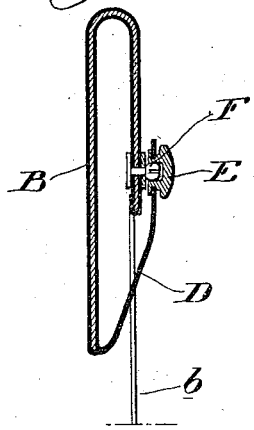
Witnesses.
Inventor.
S. D. Rappaport
Attorney.

UNITED STATES PATENT OFFICE.

SIGMUND D. RAPPAPORT, OF PHILADELPHIA, PENNSYLVANIA.

SUPPORT FOR CHATELAINES.

SPECIFICATION forming part of Letters Patent No. 575,007, dated January 12, 1897.

Application filed June 10, 1896. Serial No. 594,952. (No model.)

*To all whom it may concern:*

Be it known that I, SIGMUND D. RAPPAPORT, of the city and county of Philadelphia, State of Pennsylvania, have invented an Improvement in Supports for Chatelaines, of which the following is a specification.

My invention relates to supports for chatelaines, &c.; and it consists of the improvements which are fully set forth in the following specification and claims and are shown in the accompanying drawings.

It has been customary to suspend chatelaines and similar articles from the belt, but heretofore such articles have been permanently connected with the belt or connected in such a way that they have not been readily disconnectable, or when made readily disconnectable they have not been fastened sufficiently securely to prevent theft or loss by accidental disconnection.

It is the object of my invention to provide a chatelaine with a supporting and fastening device of such character that when fastened it will securely fasten the chatelaine to the belt, but may be easily and quickly unfastened to release the chatelaine and permit it to be detached.

It is also an object of my invention to provide a fastening and supporting device of such a character that it may be applied to any belt that may be worn.

In the accompanying drawings, Figure 1 is a perspective view of a chatelaine provided with my improved supporting and fastening device. Fig. 2 is a longitudinal vertical view, enlarged, of the fastening and supporting device; and Fig. 3 is a similar view of a modification thereof.

A is the chatelaine or bag.

B is a hook from which the bag is suspended, as by the strips *b b*. The hook B preferably consists of a bent flat metal piece, having one end shorter than the other, which may be covered with cloth, leather, or other suitable material, if desired. The chatelaine is suspended from one member of the hook B, while the other member or end is adapted to engage the belt C. The particular shape and form of the hook is, however, not material.

D is a flap or tab attached to one end of the hook B and provided at the other end with means for detachably fastening it to the other member or end of the hook. Any suitable fastening may be employed. I have shown a spring ball-and-socket fastener E F, the socket E being carried by the flap D and the ball F by the end of the hook B. The tab preferably consists of a piece of flexible material, such as leather.

In Fig. 2 I have shown the flap D secured to the end of the outer and shorter piece of the hook B and having the detachable connection E F with end of the inner and longer piece, while in Fig. 3 this construction is reversed.

The hook B is applied to the belt, and the flap D is fastened at its free end. The chatelaine is then securely attached to the belt, but may be readily disconnected by opening the fastening E F.

The details of construction shown may be varied without departing from the invention.

What I claim as new, and desire to secure by Letters Patent, is as follows:

1. A fastening device for suspending chatelaines &c., consisting of a suspending-piece having an open hook adapted to engage the belt, and a flap D fastened at one end to one portion of the hook and provided with means for detachably fastening its other end to the hook to close the open portion thereof and prevent the hook becoming disengaged from the belt.

2. A fastening device for suspending chatelaines &c., consisting of a bent metallic piece B adapted to engage the belt, and a flexible flap D fastened at one end to one portion of the piece and provided at its other end with means for detachably fastening it to the other portion of the piece A.

3. The combination with the suspension-hook B adapted to engage the belt, of the chatelaine or bag A suspended therefrom, the flap D fastened at one end to one portion of the hook B, and a detachable fastening between the other end of the flap D and the other portion of the hook B.

In testimony of which invention I have hereunto set my hand.

S. D. RAPPAPORT.

Witnesses:
R. M. HUNTER,
R. M. KELLY.